(12) United States Patent
Lemmers, Jr. et al.

(10) Patent No.: US 9,709,157 B2
(45) Date of Patent: Jul. 18, 2017

(54) CARRIER SHAFT FOR A DIFFERENTIAL

(71) Applicant: Hamilton Sundstrand Corporation, Charlotte, NC (US)

(72) Inventors: Glenn C. Lemmers, Jr., Loves Park, IL (US); Aaron M. Finke, Janesville, WI (US); Doren C. Smith, Rockford, IL (US); Andrew P. Grosskopf, Rockford, IL (US); David S. Behling, Belvidere, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 14/678,287

(22) Filed: Apr. 3, 2015

(65) Prior Publication Data

US 2016/0290491 A1 Oct. 6, 2016

(51) Int. Cl.
*F16H 48/42* (2012.01)
*F16H 57/08* (2006.01)
*F16H 47/04* (2006.01)
*F16H 48/06* (2006.01)

(52) U.S. Cl.
CPC ........... *F16H 57/082* (2013.01); *F16H 47/04* (2013.01); *F16H 48/06* (2013.01)

(58) Field of Classification Search
CPC ...... F16H 1/2836; F16H 1/2845; F16H 48/42; F16H 47/00
See application file for complete search history.

(56) References Cited

U.S. PATENT DOCUMENTS

| 2,288,206 | A | | 6/1942 | Pierpont |
| 3,043,090 | A | | 7/1962 | Sundt |
| 3,527,121 | A | * | 9/1970 | Moore ............... F16H 57/082 |
| | | | | 475/282 |
| 4,252,035 | A | | 2/1981 | Cordner et al. |

(Continued)

FOREIGN PATENT DOCUMENTS

| CN | 101059167 | 10/2007 |
| WO | 2015004385 A1 | 1/2015 |

OTHER PUBLICATIONS

Extended European Search Report for EP Application No. 16163674.7-1762, dated Mar. 7, 2017, pp. 1-7.

(Continued)

*Primary Examiner* — Ramya Burgess
*Assistant Examiner* — Lillian Nguyen
(74) *Attorney, Agent, or Firm* — Cantor Colburn LLP

(57) ABSTRACT

Embodiments herein relate to piece-part, sub-assembly, assembly, and component levels of a differential composed of a sun gear configuration and utilized in an integrated drive generator. An integrated drive generator is a hydro-mechanical transmission that drives a synchronous salient pole generator. The integrated drive generator is a constant speed output, variable speed input transmission that includes the differential and a hydraulic unit. In general, the integrated drive generator utilizes the variable speed input from an accessory gear box of an engine to drive or control a hydraulic unit, which in turn drives or controls a churn leg member of the differential. As the differential is driven, speeds of each speed member of the differential are then summed to generate the constant speed output to drive the synchronous salient pole generator.

14 Claims, 8 Drawing Sheets

(56) References Cited

U.S. PATENT DOCUMENTS

| | | |
|---|---|---|
| 4,488,053 A | 12/1984 | Cronin |
| 4,609,842 A | 9/1986 | Aleem et al. |
| 4,617,835 A | 10/1986 | Baker |
| 4,734,590 A | 3/1988 | Fluegel |
| 4,953,663 A | 9/1990 | Sugden |
| 4,965,477 A | 10/1990 | Stadler et al. |
| 5,028,803 A | 7/1991 | Reynolds |
| 5,472,383 A * | 12/1995 | McKibbin ............ F16H 57/0482 184/6.12 |
| 5,728,022 A | 3/1998 | Schultz |
| 5,845,731 A | 12/1998 | Buglione et al. |
| 6,178,840 B1 | 1/2001 | Colbourne et al. |
| 6,258,004 B1 | 7/2001 | Johnston |
| 6,387,004 B1 | 5/2002 | Parrish |
| 6,799,953 B2 | 10/2004 | Nelson |
| 6,893,208 B2 | 5/2005 | Frosini et al. |
| 7,195,578 B2 | 3/2007 | Dalenberg et al. |
| 7,472,547 B2 | 1/2009 | Grosskopf et al. |
| 8,187,141 B2 * | 5/2012 | Goleski ................ F16H 57/082 475/331 |
| 8,267,826 B2 | 9/2012 | Duong et al. |
| 8,485,936 B2 * | 7/2013 | Makulec ................ F02C 7/277 475/159 |
| 8,925,421 B2 | 1/2015 | Vanderzyden et al. |
| 9,115,794 B2 | 8/2015 | Vanderzyden et al. |
| 9,410,572 B2 | 8/2016 | Shoup et al. |
| 2001/0003108 A1 | 6/2001 | Goi et al. |
| 2004/0042698 A1 | 3/2004 | Yamamoto et al. |
| 2005/0006164 A1 | 1/2005 | Teraoka |
| 2006/0205560 A1 | 9/2006 | Meier |
| 2008/0108471 A1 | 5/2008 | Deutsch et al. |
| 2009/0101465 A1 | 4/2009 | Hart et al. |
| 2009/0203492 A1 | 8/2009 | Okabe |
| 2010/0167863 A1 | 7/2010 | Lemmers, Jr. |
| 2010/0284836 A1 | 11/2010 | Grosskopf et al. |
| 2011/0105270 A1 * | 5/2011 | Matsuoka ................ F02C 7/36 475/331 |
| 2011/0314963 A1 | 12/2011 | Poisson |
| 2013/0068057 A1 | 3/2013 | Grosskoph |
| 2013/0172145 A1 | 7/2013 | Mourani |
| 2013/0260951 A1 * | 10/2013 | Norem .................. F16H 57/082 475/331 |
| 2013/0288840 A1 * | 10/2013 | Grosskopf ............. F16H 47/04 475/84 |
| 2014/0008170 A1 | 1/2014 | Vanderzyden et al. |
| 2014/0009125 A1 | 1/2014 | Vanderzyden et al. |
| 2014/0130356 A1 * | 5/2014 | Jiang ...................... F16H 57/02 29/893.1 |
| 2015/0013488 A1 | 1/2015 | Matsuoka et al. |
| 2015/0125277 A1 | 5/2015 | Ward |
| 2016/0003339 A1 | 1/2016 | Roberts, III et al. |
| 2016/0016368 A1 | 1/2016 | Kunishima |
| 2016/0032969 A1 | 2/2016 | Kovach et al. |
| 2016/0215815 A1 | 7/2016 | Ryu et al. |

OTHER PUBLICATIONS

Extended European Search Report for EP Application No. 16163668.3-1762, dated Mar. 7, 2017, pp. 1-8.

* cited by examiner

CARRIER SHAFT FOR A DIFFERENTIAL

BACKGROUND OF THE INVENTION

Exemplary embodiments pertain to integrated drive generators and, more particularly, to a differential with a sun gear configuration for an integrated drive generator.

In general, aircraft electric power generation utilizes a hydro-mechanical transmission that receives a power input, at variable speed, from an engine to drive a generator at a constant speed. The hydro-mechanical transmission includes a differential to convert the variable speed of the engine to the constant speed for the generator.

At present, a configuration of the differentials used in the hydro-mechanical transmission for aircraft electric power generation is a two ring gear configuration. The two ring gear configuration includes a first ring gear to first planet gear mesh, a first planet gear to second planet gear mesh, and second planet gear to second ring gear mesh configuration. The two ring gear configuration has a specific differential ratio of one (1) due to the first and second planet gears being the same size. This specific differential ratio limits the two ring gear configuration to a lower input speed range. In addition, the two ring gear configuration forces specific packaging arrangements of the hydro-mechanical transmission. Particularly, the differential must be side-to-side with a hydraulic unit and include gearing between the differential and the hydraulic unit.

BRIEF DESCRIPTION OF THE INVENTION

According to one embodiment of the present invention, a carrier shaft for an integrated drive generator is provided. The carrier shaft comprises first and second carrier platforms matched machined to control a true position of rolling element races; a first pair of diameter roller bearings on either end of the carrier shaft to support the carrier shaft within the integrated drive generator; a second pair of diameter roller bearings in a middle of the carrier shaft to support the ring gear to the carrier shaft.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
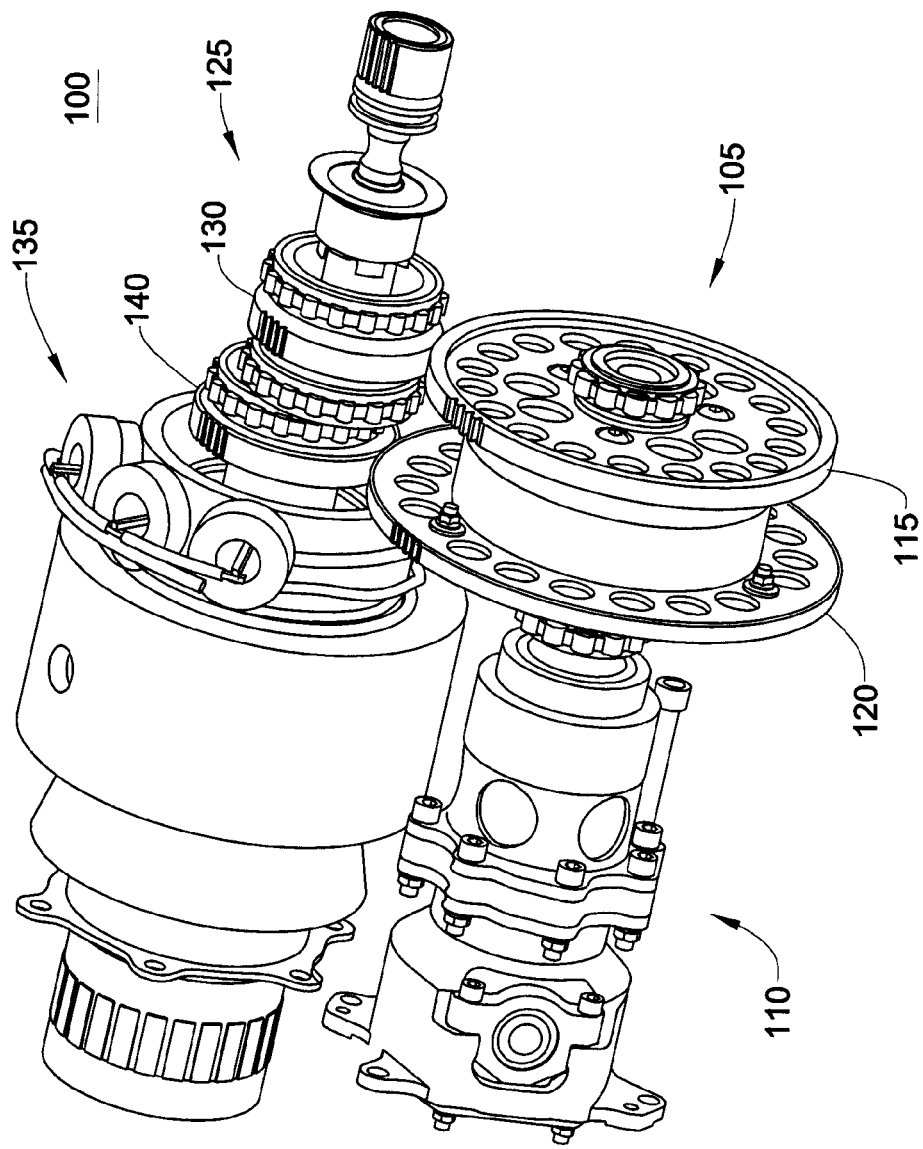
FIG. 1 depicts a perspective view of a differential of and integrated drive generator.

In contrast to the sun-less differential type described above, embodiments herein relate to piece-part, sub-assembly, assembly, and component levels of a differential composed of a sun gear configuration and utilized in an integrated drive generator.

An integrated drive generator is a hydro-mechanical transmission that drives a synchronous salient pole generator. The integrated drive generator is a constant speed output, variable speed input transmission that includes the differential and a hydraulic unit. In general, the integrated drive generator utilizes the variable speed input from an accessory gear box of an engine to drive or control a hydraulic unit, which in turn drives or controls a churn leg member of the differential. As the differential is driven, speeds of each speed member of the differential are then summed to generate the constant speed output to drive the synchronous salient pole generator.

The differential can include speed members, such as a carrier shaft, which supports the planet gears; a sun gear; and a ring gear. The carrier shaft is driven based on the variable speed input from the engine. Note that the speed of the carrier shaft can be directly proportional to the engine speed. The carrier shaft through the planet gears drives the sun gear, which in turn drives the ring gear. The sun gear itself is independently varied (e.g., actively controlled) so that as the variable speed of the carrier shaft is transferred to the sun gear, the ring gear can be driven at a constant speed. The ring gear, thus, drives the synchronous salient pole generator at the constant speed output.

To actively control the sun gear, a piston, pump, and motor set of the hydraulic unit are utilized to vary a speed of the sun gear. The piston, pump, and motor set can be a back-to-back axial piston pump configuration, where one portion is a motor and the other potion is a pump. A first portion of the back-to-back axial piston pump configuration is driven proportionally off the speed of the engine (e.g., similar to the carrier shaft) and utilizes a variable swash plate to control displacement of the first portion. Note that based on the angle of the variable swash plate and whether that angle is a negative or positive sign the first portion can be a pump or a motor. Thus, the first portion drives or is driven by a fixed displacement pump (e.g., a second portion of the back-to-back axial piston pump configuration), which in turn controls the sun gear speed.

In view of the above, the differential of the integrated drive generator comprises a specific differential ratio (e.g., at or close to 0.5) that enables the receipt of any input speed along an extensive range. In this way, the integrated drive generator can be utilized in a high speed pad of an aircraft electric power generation system. In addition, the differential enables packaging advantages for the integrated drive generator, such as enabling the differential to be in-line with the hydraulic unit (e.g., enables coaxial packaging), which eliminates gearing between the sun gear and the hydraulic unit and reduces a size of a front region of the integrated drive generator.

Turning now to FIG. 1, a perspective view of an integrated drive generator 100 (e.g., epicyclic gear train that performs electrical power generation and speed component) that comprises a differential 105. The differential 105 includes an input driven gear 115 and an output driven gear 120 (not that these gear spins at a constant speed). The differential 105 is in-line with a hydraulic unit 110, which may include two pumps. The input driven gear 115 of the differential 105 is operatively coupled to an input system 125 via input drive gear 130. The output driven gear 120 of the differential 105 is operatively coupled to a generator 135 (e.g., main stator where electricity is generated) via a driven gear 140. Based on this operative coupling, the differential 105 converts a variable speed input from the input system 125 supplied by a variable speed drive source into a constant speed output employed to drive generator 135. The variable speed drive source can be an aircraft engine; however, it should be understood, that the variable speed drive source may take on a variety of forms.

Figure 2:
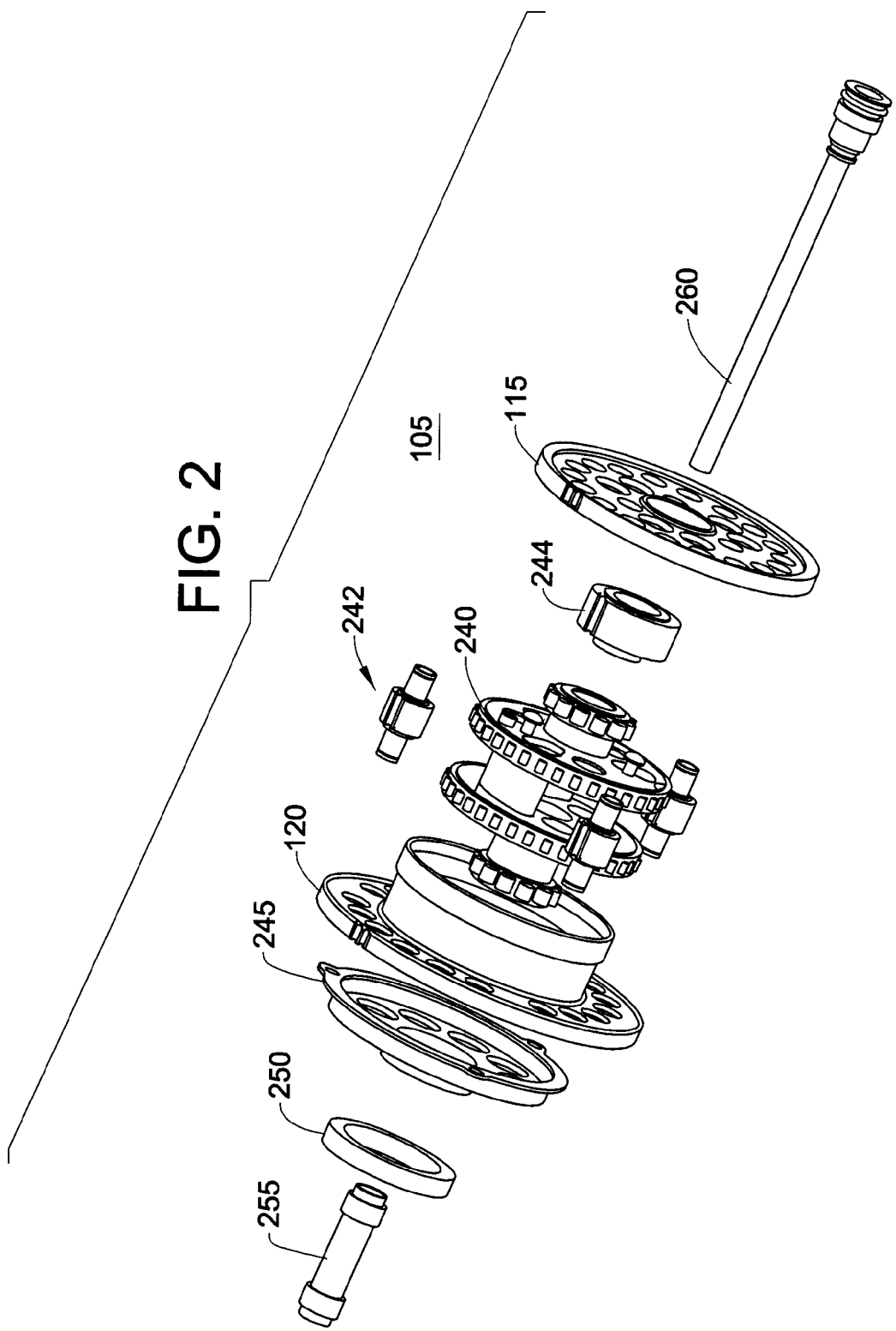
FIG. 2 depicts an exploded view of the differential of FIG. 1.

FIG. 2 depicts an exploded view of the differential 105, which includes the input driven gear 115, the output driven gear 120, a carrier shaft 240, a planet gear system 242, a sun gear 244, an accessory drive gear hub 245, an accessory drive gear 250, a first shaft 255 that spins at a fixed speed, a second shaft 260 that spins at a variable speed, and journal bearings (not shown). The input driven gear 115 is operatively connected to the sun gear 244. The sun gear 244, along with the planet gear system 242, is supported by the carrier shaft 240. The carrier shaft 240 is coupled to the output driven gear 120, which is engages the driven gear 140 on generator 135. The output driven gear 120 is further operatively coupled to the accessory drive gear hub 245, which supports the accessory drive gear 250. The carrier shaft 240 will now be described below with reference to FIGS. 3-8.

Figure 3:
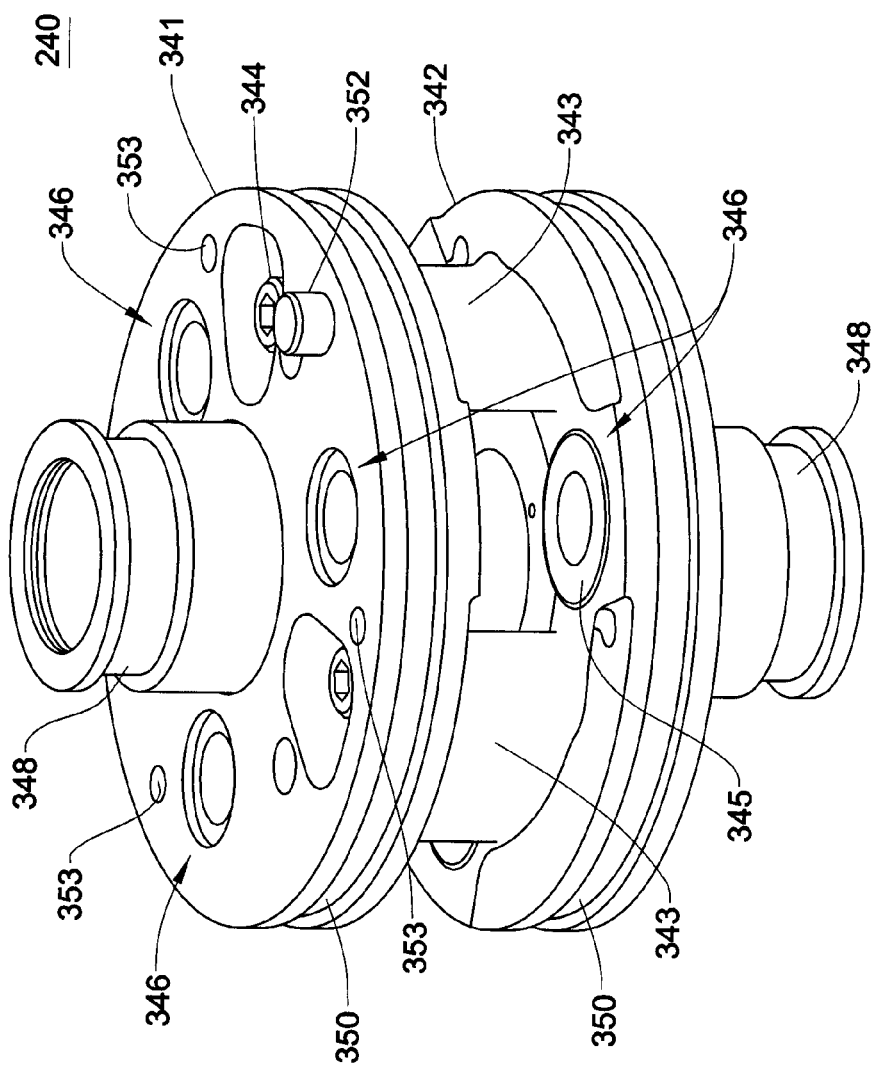
FIG. 3 illustrates an isometric view of a carrier shaft.

FIG. 3 illustrates an isometric view of the carrier shaft 240 of FIG. 2. The carrier shaft 240 comprises first and second platforms 341, 342 coupled together by bracing legs 343 (e.g., two carrier halves or carrier platforms). That is, the first and second platforms 341, 342 are pinned and bolted together, then matched machined to control a true position of rolling element races (e.g., roller bearings) and construct the carrier shaft 240. In this example, the carrier shaft 240 includes three bracing legs 343. Each bracing leg 343 can utilize any combination of pins, screws, and bolts (e.g., screw 344) to couple the first and second platforms 341, 342. One of the legs may be slightly offset to provide for proper clamping and alignment.

Each carrier halve can include a plurality of planet gear bores 346 that support the planet gear system 242 and the sun gear 244. In accordance with an aspect of an embodiment, each planet gear is straddle mounted between the first and second platforms 341, 342 within journal bearings 345 that sit inside the planet gear bores 346. The diameter of each planet gear bores 346 can be about 0.5 inches (e.g., 0.458, 0.460, 0.462, 0.464, etc.). The journal bearings 345 are lined bored to reduce the misalignment between the sun gear 244 and planet gears and between the planet gears and the ring gears. In this way, the planet gears are connected to the carrier shaft 240 through the journal bearings 345, and the sun gear 244 can float in the center of the carrier shaft 240 between the planet gears. Note that the sun gear 244 is enabled to float, as it is one of the lightest members of the differential 105, so that near perfect load sharing between the planet gears is achieved.

Each carrier halve can further include a small diameter track 348 that supports small diameter roller bearings on either end of the carrier shaft 240 and in turn support the carrier shaft 240 to a static structure (e.g., such as a housing of the integrated drive generator). Each carrier halve can further include a large diameter track 350 that supports large diameter roller bearings around a middle of the carrier shaft 240 and in turn support the ring gear to the carrier shaft 240 (e.g., the ring gear can be rigidly located on the carrier shaft 240). The small and larger diameter tracks are utilized to hold the control a true position of rolling element races (e.g., roller bearings). In addition, one or both carrier halves may include a pin 352 for coupling to the input driven gear 115 and/or the output driven gear 120, and oil drain holes 353.

Figure 4:
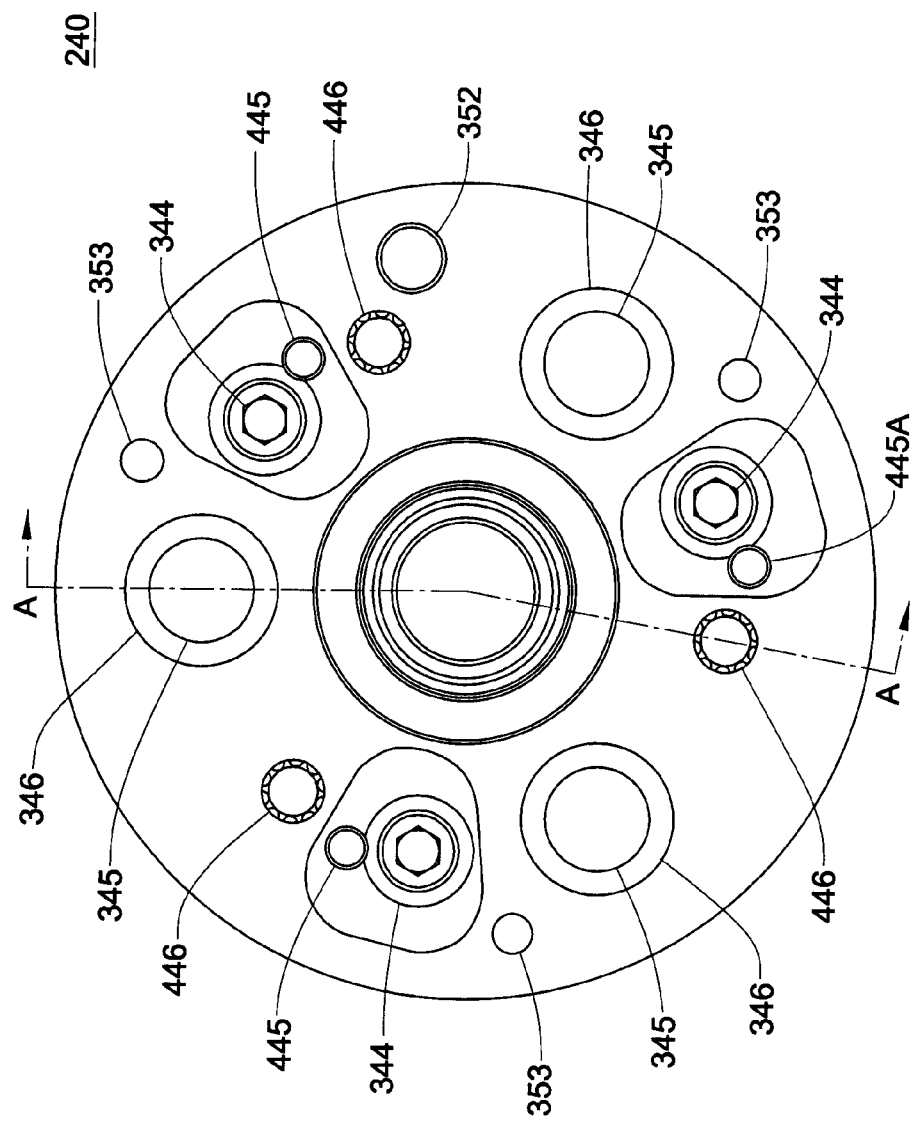
FIG. 4 illustrates a top down view of a carrier shaft.

FIG. 4 illustrates a top down view of the carrier shaft 240 of FIG. 2, and particularly the first platform 341. In FIG. 2, fasteners 344, 445, 446 are shown associated with each of the three bracing legs 343. The fasteners 344, 445, 446 may be any combination of screws, pins, and bolts. Further, while two of these combinations have identical patterns, fastener 445A (e.g., a pin) is slightly offset from the identical patterns for proper clamping and alignment.

Figure 5:
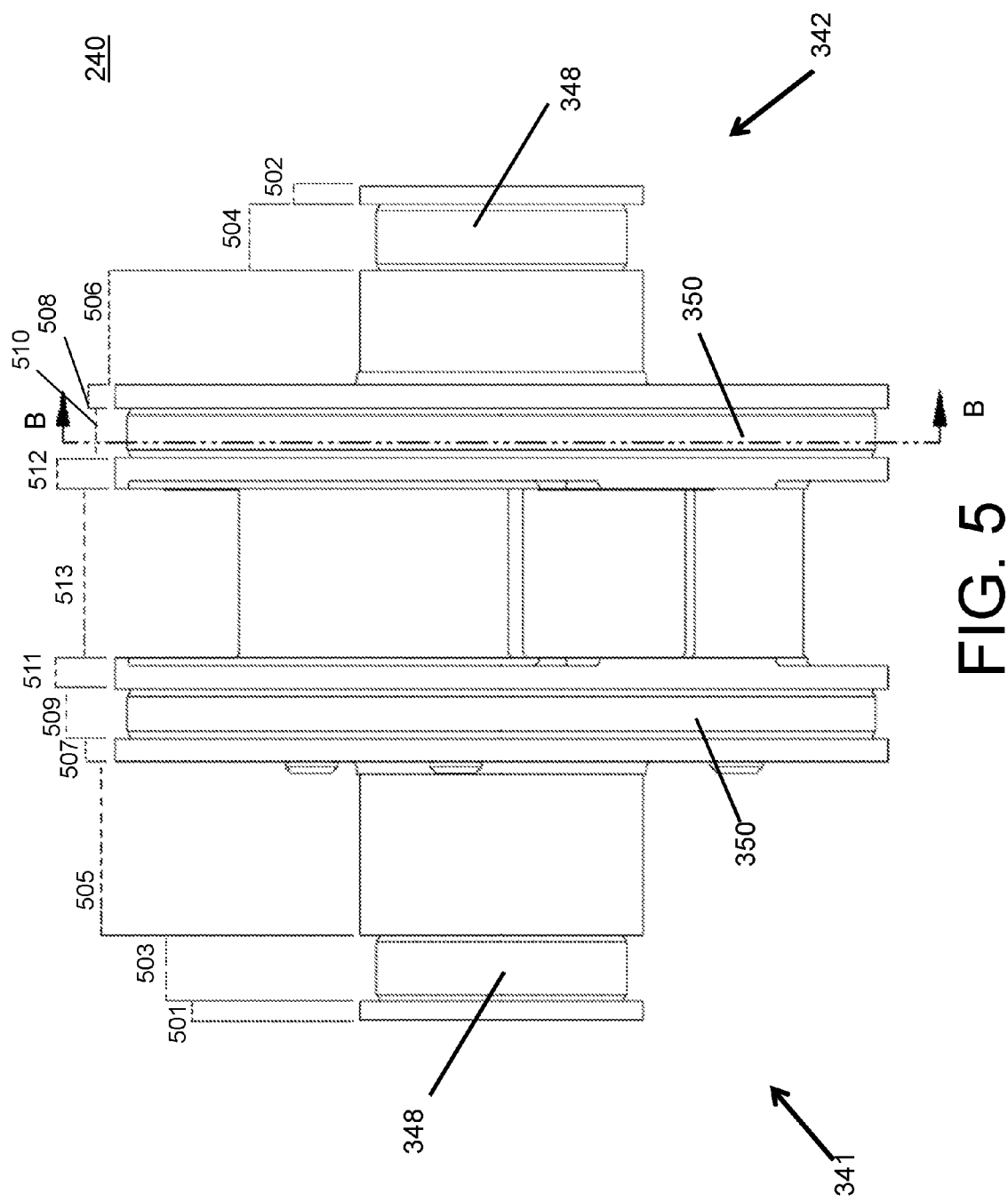
FIGS. 5-6 illustrate side views of a carrier shaft.
Figure 6:
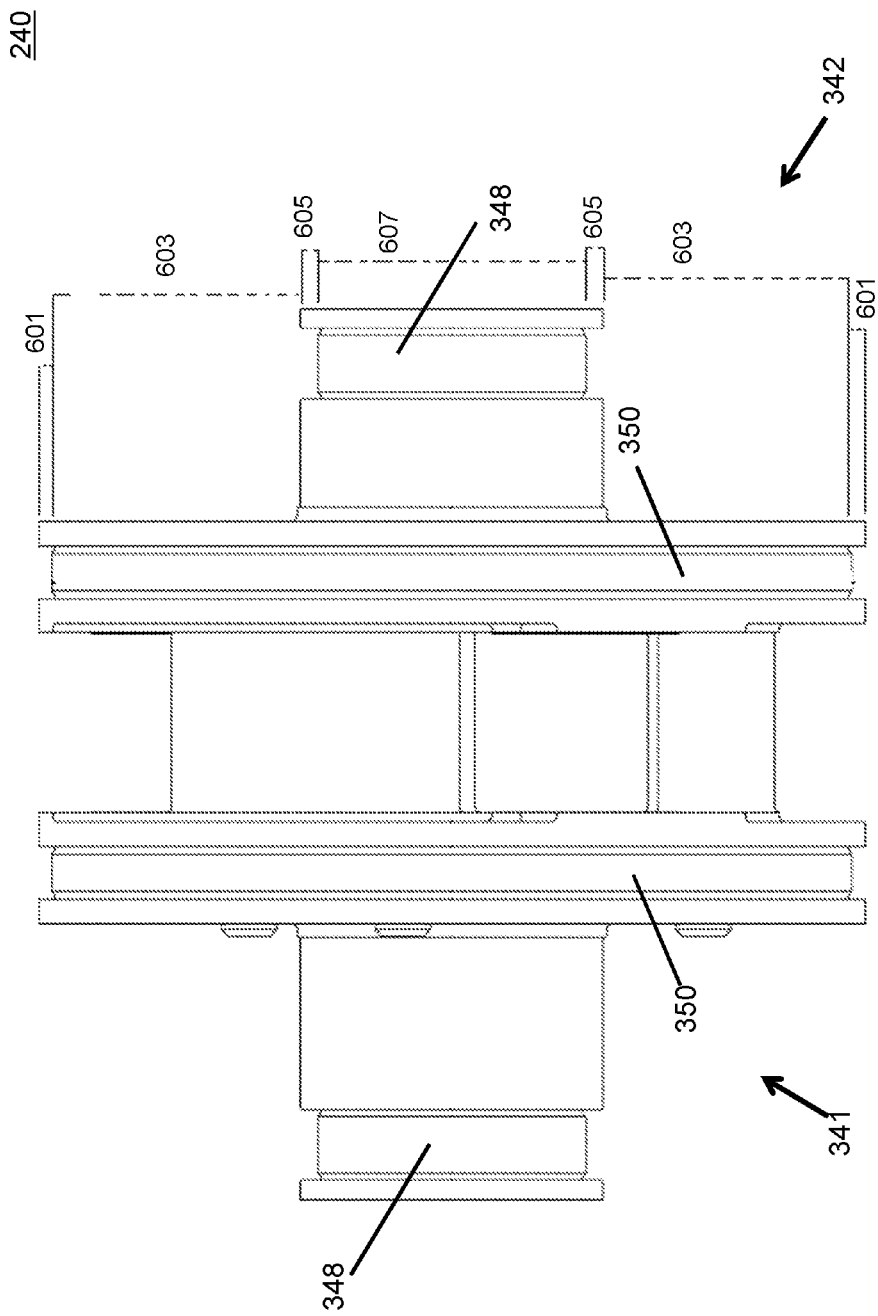

FIGS. 5-6 illustrate side views of the carrier shaft 240 of FIG. 2, along with a plurality of demarcations. Each demarcation is illustrative of a particular portion of the carrier shaft 240. For instance, in FIG. 5, demarcations 501, 502 illustrate shoulder widths of the small diameter tracks 348 of the platforms 341, 342; demarcations 503, 504 illustrate widths of the small diameter tracks 348; demarcations 505, 506 illustrate widths of ring gear supports; demarcations 507, 508 illustrate first shoulder widths of the large diameter tracks 350 of the platforms 341, 342; demarcations 509, 510 illustrate widths of the large diameter tracks 350 of the platforms 341, 342; demarcations 511, 512 illustrate second shoulder widths of the large diameter tracks 35; and demarcation 513 illustrates a center width of the carrier shaft 240.

In some embodiments, the demarcations 501, 502 can be about 0.1 inches (e.g., 0.11, 0.12, 0.13, 0.14, etc.); the demarcations 503, 504 can be about 0.3 inches (e.g., 0.31, 0.32, 0.33, 0.34, etc.); the demarcation 505 can be about 1 inch (e.g., 0.98, 0.99, 1.00, 1.01, etc.); the demarcation 506 can be about 0.6 inches (e.g., 0.59, 0.60, 0.61, 0.62, etc.); the demarcation 507 can be about 0.1 inches (e.g., 0.11, 0.12, 0.13, 0.14, etc.); the demarcation 508 can be about 0.1 inches (e.g., 0.11, 0.12, 0.13, 0.14, etc.); the demarcation 509 can be about 0.2 inches (e.g., 0.18, 0.19, 0.20, 0.21, 0.22, 0.23, 0.24, etc.); the demarcation 510 can be about 0.2 inches (e.g., 0.18, 0.19, 0.20, 0.21, 0.22, 0.23, 0.24, etc.); the demarcation 511 can be about 0.1 inches (e.g., 0.11, 0.12, 0.13, 0.14, etc.); the demarcation 512 can be about 0.1 inches (e.g., 0.11, 0.12, 0.13, 0.14, etc.); and the demarcation 513 can be about 0.6 inches (e.g., 0.59, 0.60, 0.61, 0.62, etc.). In this way, total width or length from each inside face the small diameter tracks 348 can be about 3.2 inches. Further, a length from an outside face of the large diameter track 350 of the first platform 341 to the inside face of the small diameter track 348 of the second platform 342 can be 2.25 inches. Furthermore, the outside face of the large diameter track 350 of the first platform 341 to the outside face of the large diameter track 350 of the second platform 342 can be 1.68 inches.

Further, in FIG. 6, demarcation 601 illustrates a depth of the large diameter track 350 of the second platform 342; demarcation 603 illustrates a length from an edge of the large diameter track 350 to the edge of the ring gear support; demarcation 606 illustrates a depth of the small diameter track 342 of the second platform 342; demarcation 607 illustrates a diameter of the small diameter track 342.

In some embodiments, the demarcation 601 can be about 0.1 inches (e.g., 0.11, 0.12, 0.13, 0.14, etc.); the demarcation 603 can be about 2.2 inches (e.g., 2.20, 2.22, 2.24, 2.26, etc.); the demarcation 605 can be about 0.2 inches (e.g., 0.21, 0.22, 0.23, 0.24, 0.25, 0.26, etc.); and the demarcation 607 can be about 1.2 inches (e.g., 1.19, 1.20, 1.21, 1.22, 1.23, 1.24, 1.25, 1.26, etc.). In this way, a diameter of each platform can be about 3.7 inches.

Figure 7:
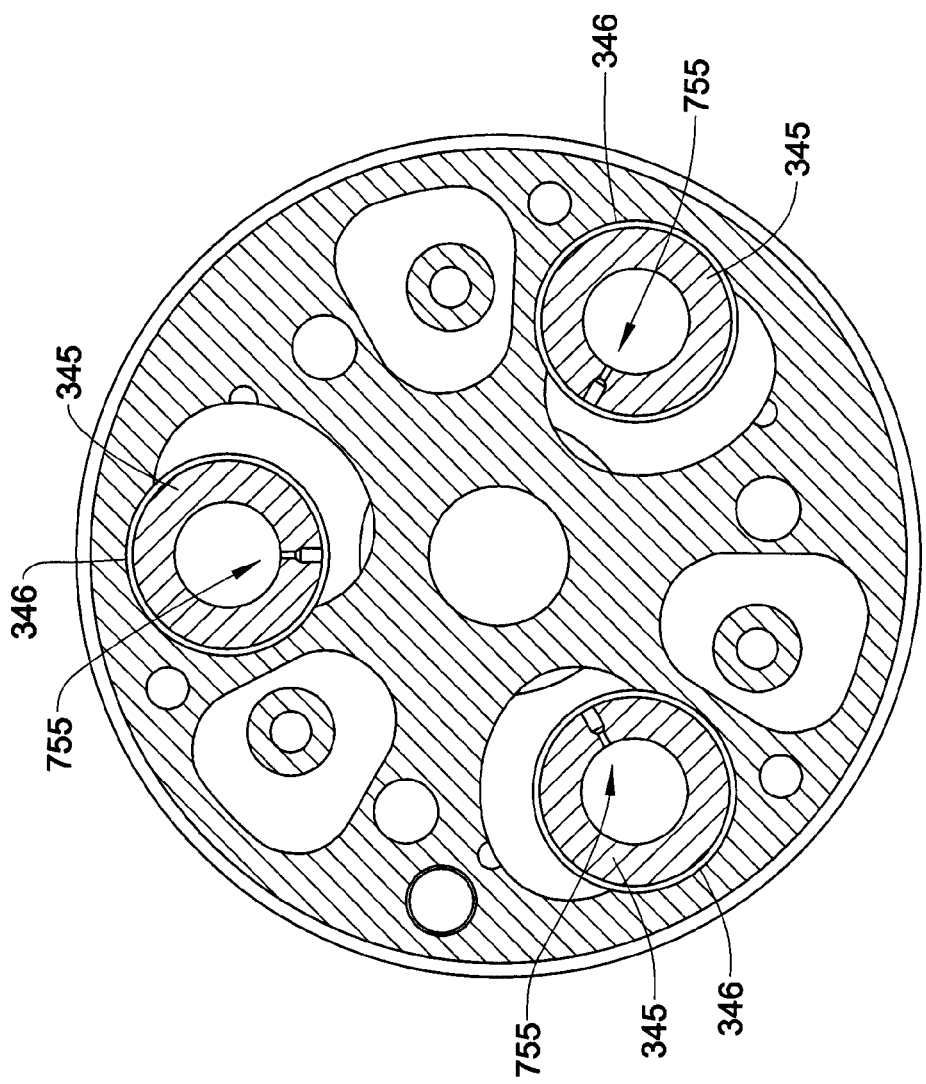
FIGS. 7-8 illustrate cross sectional views of a carrier shaft.
Figure 8:
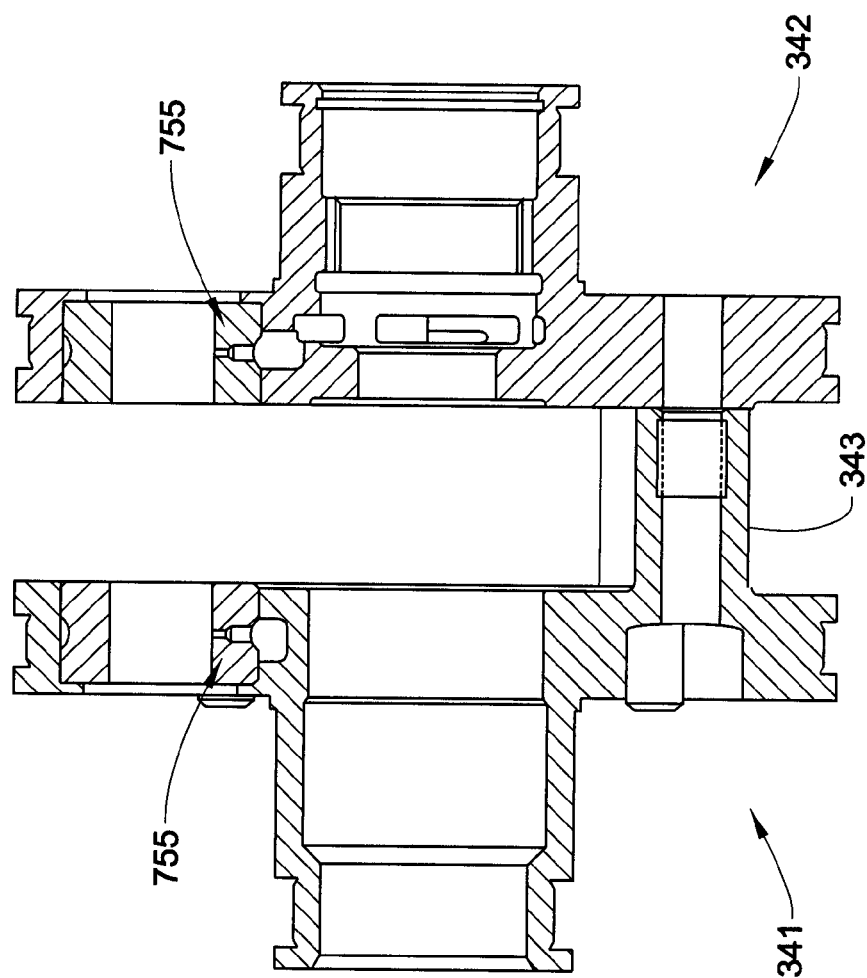

Turning now to FIG. 7, a cross section of the carrier shaft 240 across the line A-A as illustrated in FIG. 4 is depicted. Further, in FIG. 8, a cross section of the carrier shaft 240 across the line B-B as illustrated in FIG. 4 is depicted. In FIGS. 7-8, the journal bearings 345 are illustrated with fly cuts (e.g., oil feet holes 755) to communicate oil to the journal bearings 345. As indicated, the planet gears are straddle mounted between first and second platforms 341, 342 (e.g., carrier halves) within the journal bearings 345, which sit inside the planet gear bores 343. Further, in accordance with an aspect of an embodiment, the journal bearings 345 are formed from carbon and include oil feed holes 755 that enable pressurized oil to be injected into the planet gear bores 343. Carbon has self-lubricating properties that on a microscopic level enables grains of carbon rub off the journal bearings 345. Thus, in operation of the oil feed holes 755, as the planet gear rotates, the journal bearings 345 spin and drag oil through the oil feed holes 755 into a load zone. The oil is combined with the grains of carbon creating a low friction interface. Note that due to a speed trimming by the differential the planet gear speed becomes relatively low at max engine input speeds. The relatively low speed of the planet gear prevents ideal hydro dynamic support of the planet gears. Thus, the low friction interface creates a hydrodynamic lift that reduces/eliminates contact between the journal bearings 345 and the carrier shaft 240.

The terminology used herein was chosen to best explain the principles of the embodiments, the practical application or technical improvement over technologies found in the marketplace, or to enable others of ordinary skill in the art to understand the embodiments disclosed herein. The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof. Furthermore, the term "about" is intended to include the degree of error associated with measurement of the particular quantity based upon the equipment available at the time of filing the application. For example, "about" can include a range of ±8% or 5%, or 2% of a given value.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A carrier shaft for an integrated drive generator comprising:
    first and second carrier platforms matched machined to control a true position of rolling element races;
    a first pair of diameter roller bearings on either end of the carrier shaft to support the carrier shaft within the integrated drive generator; and
    a second pair of diameter roller bearings in a middle of the carrier shaft to support an output driven gear to the carrier shaft,
    wherein a length of the carrier shaft from an outside face of a first track of the first carrier platform to an inside face of a second track of the second carrier platform is about 2.2 inches.

2. The carrier shaft of claim 1, wherein each of first and second carrier platforms include a plurality of planet gear bores.

3. The carrier shaft of claim 2, wherein each planet gear bore is configured to house a journal bearing.

4. The carrier shaft of claim 2, wherein a diameter of at least one of the plurality of planet gear bores is about 0.46 inches.

5. The carrier shaft of claim 1, wherein a sun gear floats between a plurality of planet gears straddle mounted between the first and second carrier platforms of the carrier shaft.

6. The carrier shaft of claim 1, wherein the output driven gear is a ring gear that is rigidly connected to the carrier shaft.

7. The carrier shaft of claim 1, further comprising:
    a plurality of bracing legs, wherein each bracing leg utilizes a set of fasteners to couple the first and second carrier platforms.

8. The carrier shaft of claim 7, wherein the set of fasteners of one of the bracing legs comprises an offset fastener configured to provide alignment between the first and second carrier platforms.

9. A carrier shaft for an integrated drive generator comprising:
    first and second carrier platforms matched machined to control a true position of rolling element races;
    a first pair of diameter roller bearings on either end of the carrier shaft to support the carrier shaft within the integrated drive generator; and
    a second pair of diameter roller bearings in a middle of the carrier shaft to support an output driven gear to the carrier shaft,
    wherein a length of the carrier shaft from a first inside face of a first track of the first carrier platform to a second inside face of a second track of the second carrier platform is about 3.2 inches, and
    wherein the first and second track hold the rolling element races.

10. The carrier shaft of claim 1, further comprising:
    a plurality of tracks for housing of the rolling element races,
    wherein a depth of at least one of the tracks is about 0.1 inches.

11. The carrier shaft of claim 1, wherein a diameter of each of the first and second carrier platforms can be about 3.7 inches.

12. The carrier shaft of claim 1, wherein the carrier shaft is included in a differential of the integrated drive generator,
    wherein the differential is operatively coupled to an input system via input drive gear fixed to the carrier shaft, and
    wherein the differential is operatively coupled to the integrated drive generator via the output driven gear fixed to the carrier shaft.

13. The carrier shaft of claim 1, wherein the carrier shaft is included in a differential of the integrated drive generator,
    wherein the differential is in-line with a hydraulic unit of the integrated drive generator, and
    wherein the hydraulic unit comprises at least one pump.

14. A carrier shaft for an integrated drive generator comprising:

first and second carrier platforms matched machined to control a true position of rolling element races;
a first pair of diameter roller bearings on either end of the carrier shaft to support the carrier shaft within the integrated drive generator; and
a second pair of diameter roller bearings in a middle of the carrier shaft to support an output driven gear to the carrier shaft,
wherein a length of the carrier shaft from an outside face of a first track of the first carrier platform to an outside face of a second track of the second carrier platform is about 1.6 inches.

* * * * *